UNITED STATES PATENT OFFICE.

MERANO BUTTERFIELD, OF INDIANAPOLIS, INDIANA.

IMPROVED PREPARATION OF SUGAR, CALLED "TABLE-MANNA."

Specification forming part of Letters Patent No. 17,021, dated April 14, 1857.

*To all whom it may concern:*

Be it known that I, MERANO BUTTERFIELD, of Indianapolis, in the county of Marion and State of Indiana, have invented a new and useful method of making, manufacturing, or changing white sugar into what I term "Table-Manna," as a substitute for honey, by the combination of the sulphate of alumina and potassa with white sugar in a liquid or semi-fluid state; and I hereby declare that the following is a full, clear, and exact description, in general, of the mode of preparing the same.

Into any nicely-cleaned kettle over a fire, I put one quart of water and a quarter or a half ounce of the sulphate of alumina and potassa, (common alum,) and bring the same to a brisk boiling. Then remove the kettle from the fire, and into its contents put eight pounds of good white sugar, which is to be well mixed with the water, and again placed over a brisk fire. Stir the contents of the kettle occasionally, and bring the compound to an effervescent boiling for about one minute. Then remove the kettle from the fire. Strain the contents through a cloth into a tin or earthen vessel, which is to be placed in a cool situation, that the heat may escape more readily.

What I claim as new, and desire to secure by Letters Patent, is—

The use of the sulphate of alumina and potassa, or its equivalent, in the manufacture, from white sugar, of a substitute for honey.

MERANO BUTTERFIELD.

Witnesses:
H. W. ELLSWORTH,
S. A. COLLEY.